US008825088B2

(12) United States Patent
Muhonen et al.

(10) Patent No.: US 8,825,088 B2
(45) Date of Patent: Sep. 2, 2014

(54) METHOD AND SYSTEM FOR LOCATING A MOBILE TERMINAL

(75) Inventors: Ahti Muhonen, Hirvihaara (FI); Jens Staack, Ojakkala (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/499,074

(22) PCT Filed: Dec. 27, 2001

(86) PCT No.: PCT/EP01/15345
§ 371 (c)(1),
(2), (4) Date: Jun. 15, 2004

(87) PCT Pub. No.: WO03/065750
PCT Pub. Date: Aug. 7, 2003

(65) Prior Publication Data
US 2005/0014500 A1    Jan. 20, 2005

(51) Int. Cl.
*H04W 24/00* (2009.01)
(52) U.S. Cl.
USPC ........................................ 455/456.5; 370/338
(58) Field of Classification Search
CPC ....... H04W 40/00; H04W 36/12; H04W 8/02; H04W 8/04
USPC ................. 455/404.2, 141.2, 433, 445, 456.1, 455/456.5, 456.6, 414.2, 432, 560; 370/352–356
See application file for complete search history.

(56) References Cited

U.S. PATENT DOCUMENTS

| | | | |
|---|---|---|---|
| 5,862,481 A | 1/1999 | Kulkarni et al. | 455/432 |
| 6,073,012 A * | 6/2000 | Vanden Heuvel et al. | 455/427 |
| 6,219,557 B1 | 4/2001 | Havinis | 455/456.4 |
| 6,463,270 B1 * | 10/2002 | Chang et al. | 455/403 |
| 6,469,998 B1 | 10/2002 | Burgaleta | 370/338 |
| 6,622,016 B1 * | 9/2003 | Sladek et al. | 455/414.1 |
| 6,662,014 B1 | 12/2003 | Walsh | 455/456.2 |
| 6,735,441 B1 | 5/2004 | Turgeon et al. | 455/433 |
| 7,403,517 B2 * | 7/2008 | Westman | 370/352 |
| 2002/0072352 A1 | 6/2002 | Jana et al. | 455/414 |
| 2002/0080968 A1 | 6/2002 | Olsson | 380/270 |

(Continued)

FOREIGN PATENT DOCUMENTS

| | | | |
|---|---|---|---|
| EP | 1 158826 A2 | 11/2001 | H04Q 7/38 |
| WO | WO 00/69199 | 11/2000 | H04Q 7/38 |
| WO | 00/76171 | 12/2000 | G01C 21/20 |
| WO | WO 01/72007 A1 | 9/2001 | H04L 29/06 |
| WO | WO 01/91389 A2 | 11/2001 | H04L 12/56 |
| WO | WO 02054811 A1 * | 7/2002 | |

OTHER PUBLICATIONS

Napolitano-Ricagni: "UNTS all-IP Mobility Management, Call and Session Control Procedure" Mar. 24, 2000, XP002149519.
3rd Generation Partnership Project; Specification—3GPP TS 23.271 V5.0.0, Technical Specification Group Services and System Aspects; Functional Stage 2 description of LCS (Release 4); Oct. 2001, 69 pages.
Office Action dated May 21, 2008 in co pending U.S. Appl. No. 10/456,517.

*Primary Examiner* — Marcos Batista
(74) *Attorney, Agent, or Firm* — Ditthavong & Steiner, P.C.

(57) ABSTRACT

The present invention relates to a method and system for locating a mobile terminal addressed in a location service request by an overlay identity. A database is accessed to obtain a first routing information of the mobile terminal based on the overlay identity, and the first routing information is then used to access a sub-scriber database in order to derive a second routing information and a cellular identity of the mobile terminal, based on which a location service of the cellular network is initiated. Thereby, a LCS clients of the overlay system (e.g. IMS) can be supported in current LCS services to enhance their functionality.

18 Claims, 2 Drawing Sheets

(56) References Cited

U.S. PATENT DOCUMENTS

| | | | |
|---|---|---|---|
| 2002/0086682 A1 | 7/2002 | Naghian | 455/456 |
| 2002/0147845 A1 | 10/2002 | Sanchez-Herrero et al. | 709/245 |
| 2003/0027569 A1 | 2/2003 | Ejzak | 455/432 |
| 2003/0027595 A1* | 2/2003 | Ejzak | 455/560 |
| 2003/0078053 A1 | 4/2003 | Abtin et al. | 455/456 |
| 2003/0100304 A1* | 5/2003 | Hazelwood | 455/433 |
| 2003/0115260 A1 | 6/2003 | Edge | 709/203 |
| 2004/0203900 A1 | 10/2004 | Cedrevall et al. | 455/456.1 |
| 2005/0152363 A1 | 7/2005 | Malik et al. | 370/389 |

\* cited by examiner

MAP-SEND-ROUTING-INFO-FOR-LCS

| Parameter name | Request | Indication | Response | Confirm |
|---|---|---|---|---|
| Invoke Id | M | M(=) | M(=) | M(=) |
| MLC Number | M | M(=) | | |
| MSISDN | C | C(=) | C | C(=) |
| IMSI | C | C(=) | C | C(=) |
| LMSI | | | C | C(=) |
| IMS identity | C | C(=) | C | C(=) |
| Network Node Number | | | C | C(=) |
| GPRS Node Indicator | | | C | C(=) |
| Additional Number | | | C | C(=) |
| User error | | | C | C(=) |
| Provider error | | | | O |

METHOD AND SYSTEM FOR LOCATING A MOBILE TERMINAL

FIELD OF THE INVENTION

The present invention relates to a method and system for locating a mobile terminal in a cellular network based on a request received from an overlay system, such as a IP (Internet Protocol) Multimedia Subsystem (IMS).

BACKGROUND OF THE INVENTION

In general, overlay systems may be provided in cellular or fixed networks for enabling network operators to offer specific services based on and built upon applications, services and protocols not supported in their networks. The intention is that such services will be developed by the network operators and other third party suppliers using the mechanisms provided by external networks, such as the Internet or other external network systems or subsystems.

Recently, an IP Multimedia core network Subsystem (IMS) has been developed which comprises all core network elements for provision of multimedia services. This includes a collection of signalling and bearer related network elements as defined e.g. in the Third Generation Partnership Project (3GPP) specification TS 23.002. IP Multimedia services are based on an IETF (Internet Engineering Task Force) defined session control capability which, along with multimedia bearers, utilizes the PS (Packet Switched) domain of the cellular network. In order to achieve access independence and to maintain a smooth operation with wireless terminals across the Internet, the IMS attempts to be conformant to IETF "Internet Standards". Therefore, the interfaces specified conform as far as possible to these standards for the case where an IETF protocol has been selected, e.g. SIP (Session Initiation Protocol). The IMS enables the convergence of, and access to, voice, video, messaging, data and to web-based technologies for the wireless user, and combines the growth of the Internet with the growth in mobile communications.

As already mentioned, the IMS utilizes the PS domain to transport multimedia signaling and bearer traffic. The PS domain maintains the service while the mobile terminal moves and hides these moves from the IMS. The IMS is independent of the CS (Circuit Switch) domain although some network elements may be common with the CS domain. This means that it is not necessary to deploy a CS domain in order to support an IMS based network. A User Equipment (UE) (or mobile station (MS)) consists of a mobile equipment (ME with a valid USIM (Universal Mobile Telecommunications System Subscriber Identity Module) (or SIM (Subscriber Identity Module)) attached. In the following, the abbreviation "UE" refers both to MS and user equipment, even those used for emergency calls, which do not have a valid SIM or USIM.

A UE accessing an IMS service requires an IP address which can be logically part of the visited network GPRS IP addressing domain. There are various identities which may be associated with a user of IP multimedia services. Every IMS subscriber has one or more public user identities. The public user identity is used by any user for requesting communications to other users. For example, this might be included on a business card. Both telecom numbering and Internet naming schemes can be used to address users depending on the public user identities allocated to the users. The public user identity may take the form of a SIP URL (Uniform Resource Locator) as defined in RFC 2543 and RFC 2396, or an E.164 number. At least one public user identity may be used to identify the user's information within a subscriber database, e.g. the Home Subscriber Server (HSS), e.g. during mobile terminated set-up.

A location service (LCS) feature in UMTS and GSM (Global System for Mobile Communications) provides a mechanism to support mobile location services for operators, subscribers and third party service providers. Location services may be considered as a network provided enabling technology consisting of standardized service capabilities which enable the provision of location applications. The applications may be service provider specific. In general, LCS is a service concept In a system standardization. LCS specifies all necessary network elements and entities, their functionalities, interfaces as well as communication messages to implement the positioning functionality in a cellular network. Positioning is a functionality which detects a geographical location of e.g. a mobile terminal. Principles and/or algorithms on which the estimation of the geographical location is based may be e.g. AOA, TOA or TDOA. For example, the Global Positioning System (GPS) is based on TOA while OTDOA and E-TD (on GSM) are based on TDOA.

The positioning of the UE is a service provided by the access network. In particular, all access networks (e.g. UMTS Terrestrial Radio Access Network (UTRAN), GSM/EDGE (Enhanced Datarate for GSM Evolution) Radio Access Network (GERAN), which facilitate determination of the locations of UEs, shall be able to exchange location information with a core network as defined in the 3GPP specification TS23.271, when connected to a core network.

By making use of the radio signals, the capability to determine the (geographic) location of the UE can be provided. The location information may be requested by and reported to a client (application) associated UE or by a client within or attached to the core network. The location information may also be utilized internally in a system, for example, for location assisted handover or to support other features, such as home location billing. The position information may be reported in standard, e.g. geographical coordinates, together with the time-of-day and the estimated errors (uncertainty) of the location of the UE according to the 3GPP specification TS 23.032. There are many different possible uses for the location information. As already mentioned, the positioning feature may be used internally by the GSM/UMTS network (or attached networks), by value-added network services, by the UE itself or through the network and by the third parties' services. The positioning feature may also be used by an emergency service. Although LCS has been defined for the CS and PS domains of cellular networks, it has not yet been defined for the IMS domain. Currently, the LCS service does not support IMS LCS clients to be addressed by IMS identities.

SUMMARY OF THE INVENTION

It is therefore an object of the present invention to provide a method and system for locating a mobile terminal addressed by an overlay Identity used in an overlay system, e.g. an IMS identity used in the IMS.

This object is achieved by a method of locating a mobile terminal in a cellular network, said method comprising the steps of:
receiving a location service request including an overlay identity of an overlay system;
accessing a database storing a first routing information of said mobile terminal based on said overlay identity;

Using said first routing information to access a subscriber database in order to derive a second routing information and a cellular identity of said mobile terminal; and
initiating a location service of said cellular network based on said derived second routing information and cellular identity.

Additionally, the above object is achieved by a system for locating a mobile terminal in a cellular network, said system comprising:
a gateway node for receiving a location service request including an overlay identity of said mobile terminal in an overlay system;
a database storing a first routing information of said mobile terminal;
wherein said gateway node is arranged to access said database based on said overlay identity, to use said first routing information for an access to a subscriber database in order to derive a second routing information and a cellular identity, and to initiate a location service of said cellular network based on said derived second routing information and cellular identity.

Furthermore, the above object is achieved by a gateway node for initiating a location service for locating a mobile terminal in a cellular network, said gateway node being arranged to read a first routing information from a database based on a received overlay identity of said mobile terminal in an overlay system, to use said first routing information for an access to a subscriber database in order to derive a second routing Information and a cellular identity, and to perform said initiation based on said derived second routing information and cellular identity.

Accordingly, an address mapping functionality is provided for enabling a location service for clients in overlay systems to be addressed by overlay identities, using existing LCS functionalities.

Preferably, other identities of said mobile terminal may be derived from said subscriber data base in said subscriber data base access step. In particular, the other identities may be stored in a network element having a mobile location function. Thereby, signaling requirements for deriving the other identities of the mobile terminal in future location service requests can be reduced significantly. The overlay identity may be an IMS identity, in particular a SIP URL.

Furthermore, the first routing information may be a country code, e.g. a Mobile Country Code (MCC), and a network code, e.g. Mobile Network Code (MNC), of said mobile terminal.

The subscriber database access step may preferably be performed by using a MAP query, such as a MAP-SEND-ROUTING-INFO-FOR-LCS service function.

The cellular identity may be an MSISDN or IMSI, and the second routing information may be an address of a network element having a switching function in the cellular network.

The gateway node may be a Gateway Mobile Location Center (GMLC). The database may be comprised in the gateway node or may be a separate external entity.

The subscriber database may be a Home Location Register (HLR) of the cellular network. In this case, the HLR may be arranged to derive the second routing information and the cellular identity by performing a query to a Home Subscriber Server. Furthermore, the HLR may be arranged to derive other identities of the terminal device.

Preferably, the database may be arranged to provide a mapping function between the first routing function and the overlay identity of the terminal device.

Furthermore, the gateway node may be arranged to store the second routing information and/or the cellular identity, for further use.

BRIEF DESCRIPTION OF THE DRAWINGS

In the following, the present invention will be described in greater detail based on a preferred embodiment with reference to the accompanying drawings, in which.

DESCRIPTION OF THE PREFERRED EMBODIMENT

Figure 1:
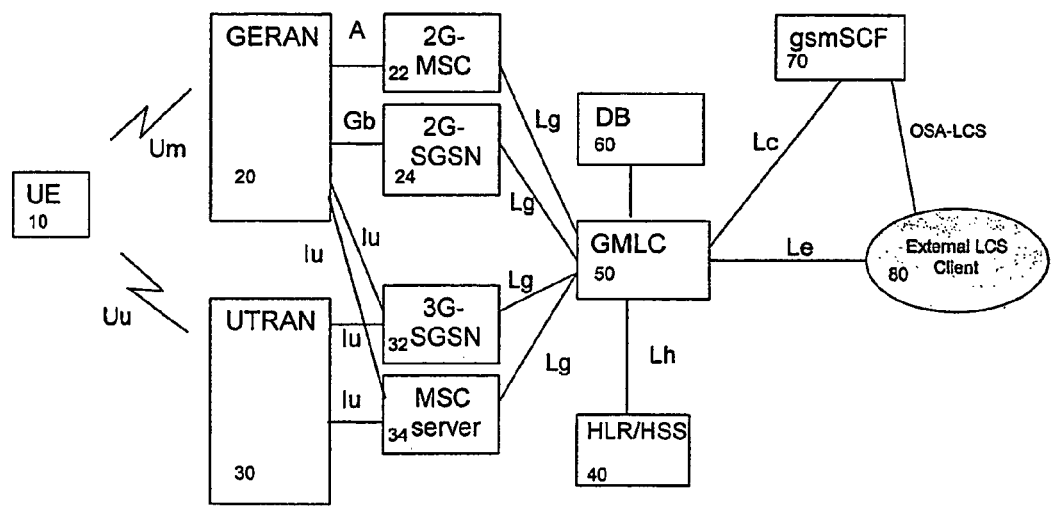
FIG. 1 shows a network architecture for implementing a location service function according to the preferred embodiment of the present invention.

The preferred embodiment will now be described based on an LCS architecture in a UMTS network as shown in FIG. 1. According to FIG. 1, a reference point, called Le Interface, is shown between an LCS server (here: GMLC 50) and an LCS client 80 which, in the present embodiment, is an IMS server or application. The Le reference point is described In the 3GPP Specification TS 22.071. However, there may be more than a single LCS network interface to several different LCS clients or other networks. These networks may both differ in ownership as well as in communications protocol. The network operator may define and negotiate interconnection with each external LCS client or other network. In general, an interface differs from a reference point in that an interface is defined where specific LCS information is exchanged and needs to be fully recognized.

Furthermore, an Interface called Lg is arranged to connect two independent LCS networks, e.g. different PLMNs (Public Land Mobile Networks) for message exchange. The LCS functional entities are grouped into an LCS client functional group and an LCS server functional group. The LCS server functional group consists of functions in the UMTS PLMN supporting LCS, e.g. a client handling component, a system handling component, a subscriber handling component, and a positioning component. The LCS client 80 contains an LCS component with one or more clients, which by using location information can provide location based services. In particular, the LCS client 80 is a logical functional entity that requests from the LCS server in the PLMN location information for one or more than one target UE, i.e. a UE 10 shown in FIG. 1, within a specified set of parameters such as Quality of Service of QoS.

In the present architecture shown in FIG. 1, the LCS client 80 resides in an external entity belonging to an overlay system, i.e. the IMS. Via a location service request, the LCS client 80 communicates with the LCS server, i.e. GMLC 50, to request for the location information of the UE 10. Attributes identified by the location service request may be target UE, LCS identity, state, event, requested QoS information, local coordinate reference system, and/or geographical area. A location service response is sent to the LCS client 80 as the result of the location service request issued by the LCS server. Attributes identified for the location service response may be the location indication of the UE 10 in geographical coordinates, the location of the UE 10 as an ellipsoid with axes and direction of all axes, an estimated achieved QoS, and/or an indication when UE 10 enters or leaves the geographical area.

FIG. 1 illustrates generally the relation of the LCS client 80 and servers in the core network with a GERAN 20 and a UTRAN 30. The LCS entities within the access networks communicate with the core network consisting of a 2G-MSC 22 of the CS domain, a 2G-SGSN 24 of the PS domain, a 3G-SGSN 32 of the PS domain, and an MSC server 34 of the PS domain across A, Gb and Iu interfaces. Communication among the access network LCS entities makes use of the messaging and signaling capabilities of the access network.

Furthermore, a subscriber database, i.e. a HLR/HSS 40 is provided for storing subscriber specific data of the UE 10 and other mobile terminals or equipments. It is noted that the HLR and HSS may be arranged at different locations, while the HLR part may include both 2G-HLR and 3G-HLR functionalities. In this respect it is noted, that the terms "2G" and "3G" denote second and third generation mobile communication functionalities, respectively.

With this configuration both the network and the UE 10 are able to measure the timing of signals and compute a location estimate of the UE 10. Depending on the applied positioning method it is possible to utilize the corresponding configuration containing all needed entities. For instance, if network-based positioning is applied, the entities that are involved in measuring the mobile's signal and calculating its location estimate are allocated to the network elements of the access stratum. On the other hand, in case mobile-based or network-assisted methods are used entities should be allocated to the UE 10.

The GMLC 50 contains functionality required to support LCS. In one PLMN, there may be more than one GMLC. The GMLC 50 is the first node the external LCS client 80 accesses in a GSM PLMN (i.e. the Le reference point is supported by the GMLC 50). The GMLC 50 may request routing information from the HLR/HSS 40 via a Lh interface. After performing registration authorization, it sends positioning requests to either the 2G-MSC 22, SGSNs 24, 32 or MSC server 34 and receives final location estimates from the corresponding entity via the Lg interface. The UE 10 may be involved in various positioning procedures. Specific UE involvement is specified in each of the positioning procedures mentioned in the 3 GPP specification TS 25305 for the UTRAN 30 and TS 43.059 for the GERAN 20. The 2G-MSC 22 contains a functionality responsible for UE subscription authorization and managing call related and non-call related positioning requests of LCS. The 2G-MSC 22 is accessible to the GMLC 50 via the Lg interface. The LCS functions of the 2G-MSC 22 are related to charging and billing LCS coordination, location request authorization and operation of the LCS services. If connected to the 2G-SGSN 24 through a Gs interface, it checks whether the UE 10 is GPRS attached to decide whether to page the UE 10 on the A or Gs interface.

The MSC server 34 handles the same functionality as the 2G-MSC 22 including charging and billing, LCS coordination, location requests, authorization and operation of the LCS services. The MSC server 34 is accessible to the GMLC 50 via the Lg interface. Furthermore, the 2G- and 3G-SGSNs 24, 32 contain a functionality responsible for UE subscription authorization and managing positioning requests of LCS. The SGSNs 24, 32 are accessible to the GMLC via the Lg interface. The LCS functions of the SGSNs 24, 32 are related to charging and billing, LCs coordination, location request, authorization and operation of the LCS services. The SGSNs 24, 32 forward the CS paging request received from the Gs interface to a base station subsystem or radio network controller of the respective access network.

The HLR/HSS 40 is accessible from the GMLC 50 via a Lh interface. For a roaming UE, the HLR/HSS 40 may be in a different PLMN.

Furthermore, a gsmSCF (GSM service control function) provides an Lc interface to support access between the LCS and a network functionality CAMEL (Customized Applications for Mobile Network Enhanced Logic) providing the mechanisms of Intelligent Network to a mobile user. The procedures and signaling associated with it are defined in the 3GPP specification TS 23.078 and TS 29.002, respectively.

An important point is the possibility to address and indicate the target UE 10 using a cellular identity, e.g., the MSISDN (Mobile Station Integrated Services Data Network Number) or IMSI (International Mobile Subscriber Identity), or the like. However, in the present case, the external LCS client 80 belongs to the IMS and thus uses an IMS identity in the location service request supplied to the GLMC 50. Therefore, a mapping function is provided for mapping the IMS identity of the UE 10 with a routing information required for accessing the HLR/HSS 40 allocated to the target UE 10. Thereby, an IP addressing of the target UE 10 can be performed without requiring an active PDP context established between the target UE 10 and the external LCS client 80.

The Lh interface between the GMLC 50 and the HLR/HSS 40 may be based on a Mobile Application Part (MAP) protocol. This interface Lh is used by the GMLC 50 to request a routing information to the serving MSC or SGSN of the particular target UE 10 whose location has been requested. The Lg interface is used by the GMLC 50 to convey the location request to the respective MSC or SGSN function currently serving the target UE 10. Furthermore, the Lg interface is used by the respective MSC or SGSN function to return location results to the GMLC 50.

For the LCS service, a MAP-SEND-ROUTING-INFO-FOR-LCS service is used between the GMLC 50 and the HLR/HSS 40 to retrieve the routing information needed for routing a location service request to the serving MSC or SGSN function. In case the GMLC 50 receives a location service request from the external LCS client 80, which contains an IMS identity the GMLC 50 accesses the database 60 which may be arranged in the GMLC 50 or as a separate external entity to derive the routing information to the HLR/HSS 40. The IMS identity may be a public identity, such as a SIP URL, which is mapped by the database 60 to a cellular routing information, e.g. an MCC and MNC of the home network of the target of the UE 10. Using this cellular routing information the GMLC 50 accesses the HLR/HSS 40 by a MAP query, e.g. a MAP-SEND-ROUTING-INFO-FOR-LCS message comprising the IMS identity, e.g. SIP URL. The HRL part of the HRL/HSS 40 may access the HSS part based on an interworking function to obtain the IMSI or any other cellular identity of the target UE 10 from the HSS part based on a corresponding mapping function. Using this cellular identity, the GMLC 50 initiates a location service function within the cellular network via the Lg interface. Thereby, an IMS LCS service functionality can be provided in the UMTS/GSM network architecture.

Figures 2, 3:
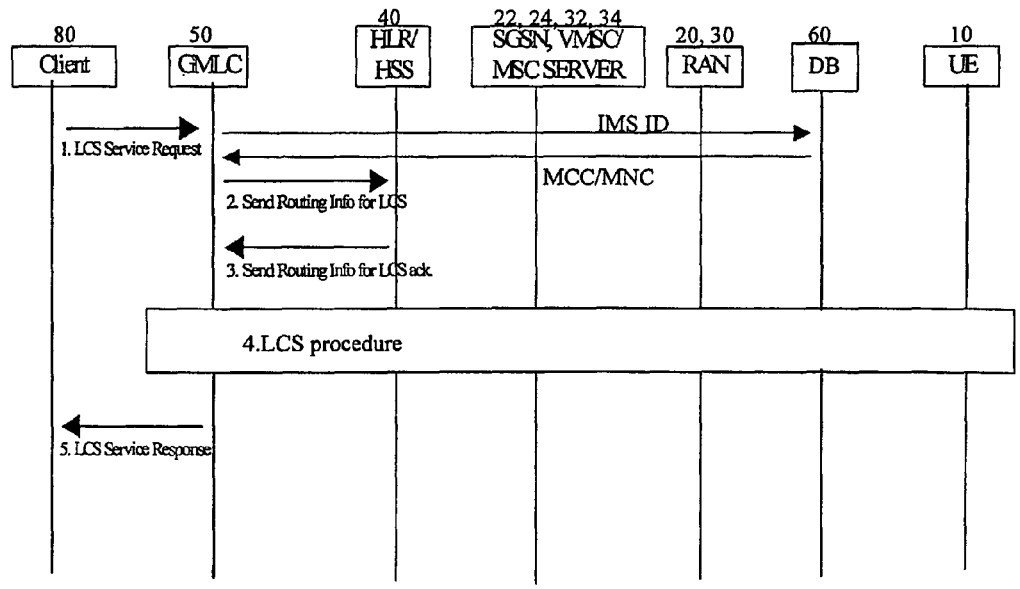
FIG. 2 shows a signaling diagram indicating exchanged signaling messages and procedures in a location service function according to the preferred embodiment of the present invention.
FIG. 3 shows a table indicating parameters of a MAP query function used in the preferred embodiment.

FIG. 2 shows a signaling diagram indicating basic signaling messages and procedures required for the location service function. In particular, the external LCS client 80 requests the current location of the target UE 10 from the GMLC 50 by using a LSC service request comprising the IMS ID of the target UE 10 (step 1). In response thereto, GMLC 50 accesses the database 60 and transfers the IMS ID to the database 60. Based on the mapping function provided at the database 60 the corresponding cellular routing information MCC/MNC is returned to the GMLC 50. Then, the GMLC 50 uses this routing function to route a MAP query comprising the MS ID to the concerned HLR/HSS 40 identified by the MCC/MNC (step 2). In response thereto, the HLR/HSS 40 returns the cellular identity (e.g. MSI) of the target UE 10 and a routing information (address of the serving network element) required for routing the LSC service request in the cellular network (step 3). Now that the GMLC 50 knows both, the IMSI and location of the serving network element, the location service procedure can be invoked in the cellular network (step 4). Finally, the GMLC 50 sends the location service response received from the cellular network to the external LCS client 80 (step 5).

To implement the mapping function between the IMS identity and the cellular identity in the HLR/HSS 40, a new parameter has to be introduced into the MAP query message, e.g. the MAP-SEND-ROUTING-INFO-FOR-LCS message. FIG. 3 indicates this new parameter, e.g. IMS identity as a conditional parameter for location service requests including an IMS identity. Thereby, the HLR/HSS 40 is in a position to provide the mapping function so as to retrieve the cellular identity of the target UE 10. Thus, the MAP-SEND-ROUTING-INFO-FOR-LCS service is enhanced so that it can carry whatever public IMS identity is available to the GMLC 50. The GMLC 50 is arranged to put the IMS identity to the MAP-SEND-ROUTING-INFO-FOR-LCS service request message instead of the conventionally used cellular identity, e.g. IMSI or MSISDN. From the point of view of the HLR/HSS 40 the new parameter is optional, i.e. if provided, a query to the HSS part is needed to map the public IMS identity to the cellular identity. The HLR/HSS 40 then returns the retrieved cellular identity to the GMLC 50 in a MAP-SEND-ROUTING-INFO-FOR-LCS service reply and the conventional CS or PS LCS methods can be used to locate the UE 10. The GMLC 50 may store the mapping between the IMS identity and the cellular identity in its internal database or memory for further queries.

Furthermore, the preferred embodiment may be enhanced by returning all public IMS identities known in the HSS part of the HLR/HSS 40 to the GML 50, so that any further location requests with other identities would not require a HLR query at all as long as the location result in the GMLC 50 is still actual.

It is to be noted that the present invention is not restricted to the provision of a location service in a IMS environment, but can be used for providing a location service in any overlay system having an own overlay identity allocated to the target mobile terminal. Thus, the preferred embodiment may vary within the scope of the attached claims.

The invention claimed is:

1. A method of locating a mobile terminal in a cellular network, wherein
 a gateway node receives a service request including an internet protocol multimedia subsystem (IMS) identity of an IMS system, accesses a database storing a first routing information of said mobile terminal based on said IMS identity; uses said first routing information to access a subscriber database in order to derive,
 a second routing information and a cellular identity of said mobile terminal; and initiates a location service of said cellular network based on said derived second routing information and cellular identity, and
 all public IMS identities known in said subscriber database are returned to said gateway node so that any further location requests with other identities would not require a subscriber database query as long as a location result exists in said gateway node.

2. A method according to claim 1, further comprising deriving other identities of said mobile terminal from said subscriber database during the derivation of the second routing information and the cellular identity.

3. A method according to claim 2, wherein said other identities are stored in a network element having a mobile location function.

4. A method according to claim 1, wherein said internet protocol multimedia subsystem identity is allocated in an internet protocol multimedia subsystem network.

5. A method according to claim 1, wherein said internet protocol multimedia subsystem identity is a session initiation protocol uniform resource locator.

6. A method according to claim 1, wherein said first routing information is a country code and a network code of said mobile terminal.

7. A method according to claim 1, wherein said accessing is performed by using a MAP-SEND-ROUTING-INFO-FOR-LCS service function.

8. A method according to claim 1, wherein said cellular identity is a mobile subscriber inte-grated services digital network number or international mobile subscriber identity.

9. A method according to claim 1, wherein said second routing information is an address of a network element, having a switching function in said cellular network.

10. A system for locating a mobile terminal in a cellular network, sid system comprising:
 a gateway node for receiving a location request including an internet protocol multimedia subsystem (IMS) identity of said mobile terminal in an IMS system; and
 a database storing a first routing information of said mobile terminal, and a subscriber database,
 wherein said gateway node is arranged to access said database based on said IMS identity, to use said first routing information for an access to said subscriber database in order to derive a second routing information and a cellular identity,
 to initiate a location service of said cellular network based on said derived second routing information and cellular identity, and to receive all public IMS identities known in said subscriber database so that any further location requests with other identities would not require a subscriber database query as long as a location result exists in said gateway node.

11. A system according to claim 10, wherein said gateway node is a gateway mobile location center.

12. A system according to claim 10, wherein said database is comprised in said gateway node.

13. A system according to claim 10, wherein said subscriber database is a home location register of said cellular network.

14. A system according to claim 13, wherein said home location register is configured to derive said second routing information and cellular identity by performing a query to a home subscriber server.

15. A system according to claim 13, wherein said home location register is configured to derive other identities of said mobile terminal.

16. A system according to claim 10, wherein said database is configured to provide a mapping function between said first routing information and said internet protocol multimedia subsystem identity of said mobile terminal.

17. A system according to claim 10, wherein said gateway node is configured to store said second routing information and/or said cellular identity.

18. A gateway node for initiating a location service for locating a mobile terminal in a cellular network, said gateway node being arranged to read a first routing information from a database based on a received internet protocol multimedia subsystem (IMS) identity of said mobile terminal in an IMS system, to use said first routing information for an access to a subscriber database in order to derive a second routing information and a cellular identity, to perform said initiation based on said derived second routing information and cellular identity, and to receive all public IMS identities known in said subscriber database so that any further location requests with other identities would not require a subscriber database query as long as the location result exists in said gateway node.

* * * * *